Oct. 8, 1940.  E. WASMUND  2,216,864
TAKE-OFF CONNECTION FOR SHEET METAL PIPE
Filed Aug. 7, 1939
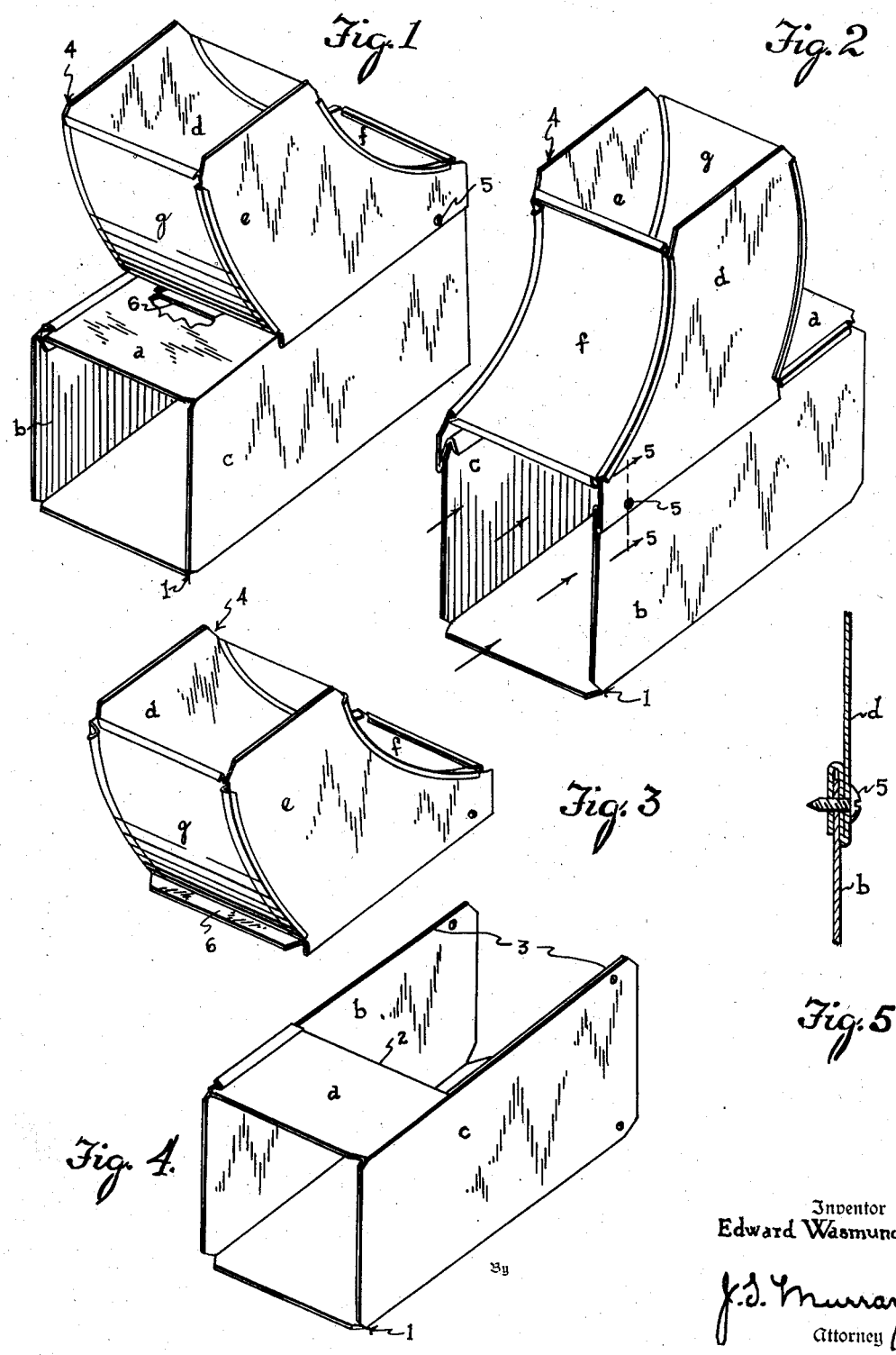
Inventor
Edward Wasmund
J. S. Murray
Attorney

UNITED STATES PATENT OFFICE 2,216,864

TAKE-OFF CONNECTION FOR SHEET METAL PIPE

Edward Wasmund, Detroit, Mich., assignor to Season-Aire Corporation of America, a corporation of Michigan Application August 7, 1939, Serial No. 288,779

3 Claims. (Cl. 285—210)

This invention relates to sheet metal pipe and particularly to take off fittings for such pipe.

An object of the invention is to provide a sheet metal take off fitting adapted to be marketed as a standardized prefabricated product, separate from its supply duct, and to be very easily installed at its point of use.

Another object is to provide a sheet metal take off fitting permitting an economy of pipe as compared to present practice.

A further object is to provide for attachment of a sheet metal pipe fitting to a duct in a simplified and time-saving manner, involving a minimum number of fasteners.

A further object is to provide an interconnected sheet metal duct and take off fitting minimizing resistance to a flow of air or the like.

A further object is to so form a sheet metal take off fitting and so connect it to its supply duct as to form a throat at the juncture of the duct and fitting of a capacity materially greater than that of the fitting, whereby frictional resistance to flow is minimized.

A further object is to adapt a prefabricated take off duct to be readily applied to supply ducts of various sizes.

These and various other objects the invention attains by the construction hereinafter described, and illustrated in the accompanying drawing, wherein:

Figs. 1 and 2 are perspective views of the improved take off fitting, as attached to a supply duct.

Fig. 3 is a perspective view of the take off fitting.

Fig. 4 is a perspective view of the supply duct, showing its adaptation to receive said fitting.

Fig. 5 is a vertical sectional detail taken on the line 5—5 of Fig. 2 showing how the supply duct and take off fitting are joined.

In these views, the reference character 1 designates a rectangular sheet metal duct of any desired length, one of its ends forming an air inlet, as indicated by arrows in Fig. 2. A wall $a$ of said duct is fully cut away in proximity to said inlet end to define a U-shaped take off opening, one edge 2, of such opening being formed by said wall and its two other edges 3, being formed by the opposed walls $b$ and $c$ adjoining the cut away wall.

Communicating with the duct 1 through said take off opening is a sheet metal take off fitting 4, curved to form an approximately ninety degree turn or such other turn as may be required, said fitting having an end flush with the inlet of the duct 1 and such flush ends jointly forming an inlet materially larger than that of the duct 1 or of the fitting 4. The fitting has substantially parallel walls $d$ and $e$ slightly overlapping the walls $b$ and $c$, the overlapped walls being interconnected in proximity to said inlet by a pair of opposite screws 5 or other fasteners. Connecting the walls $d$ and $e$ and extending from said inlet to the outlet of the fitting 4, is a wall $f$ extending through approximately a ninety degree arc. Opposed to the wall $f$ is an arcuate wall $g$ substantially concentric with the wall $f$. The wall $g$ is formed with a tongue 6 extending through the take off opening of said duct and bent to interiorly lap the wall $a$, this provision avoiding necessity for more than the two fasteners 5 in interconnecting the duct and take off fitting.

Preferably the walls $d$ and $e$ of the fitting 4 are each marginally bent to an approximate S-shape, to produce a tight joint in overlapping the walls $b$ and $c$, as best illustrated in Fig. 5.

The primary advantage of the described take off fitting lies in its adaptability to be prefabricated and readily installed at a point of use by means of such simple portable tools as metal shears and a screw driver.

In present practice the take off fittings of sheet metal pipe systems are prefabricated to some extent but only in a permanent unitary relation with the corresponding supply ducts, and hence each such fitting is suited only to a supply duct of definite capacity. Thus a contractor or concern specializing on the installation of furnaces or air conditioning apparatus must stock a great number of prefabricated fittings to be prepared for all contingencies, and there is no possibility of adapting such a fitting to a change of capacity.

Another defect of present practice is failure to minimize air friction due to altering the direction of flow. It is desirable that the take off opening have materially greater capacity than the branch duct, so that air may flow very freely through such opening. The described construction permits the take off opening to be properly proportioned to the take off fitting.

The improved fitting can be applied to supply ducts of widely varying capacities, and a contractor may less expensively adapt said fitting by a simple shearing operation to a desired supply duct than provide himself with a fitting connected as a prefabricated unit to a section of the duct. Also prefabrication of the fitting apart from the supply duct is to be preferred, as it permits the contractor to select a length of supply duct suited to a particular installation, rather than obliging him to accommodate his installation to a definite section of duct from which the fitting branches.

The relative capacities of the duct and fitting may, of course, widely vary from the construction illustrated, and the duct 1 may be curved from end to end, if desired, rather than of the illustrated straight type. Also the take off fitting may provide for other divergencies to the supply duct than the ninety degree relation illustrated.

The invention is presented as including all such modifications and changes as come within the scope of the following claims.

What I claim is:

1. In a branch take off connection, the combination with a substantially rectangular sheet metal duct having an inlet end and a take off opening receding from such end, of a take off duct communicating with said take off opening and overlapping edges of said opening formed by opposed walls of the first-mentioned duct and having a tongue extending into the first-mentioned duct in proximity to an edge of said opening extending between said opposed walls, the take off duct having an end substantially flush with the inlet end of the first-mentioned duct, such flush ends forming a substantially rectangular inlet of greater capacity than either duct, and fasteners interconnecting the two ducts adjacent to said inlet and cooperating with said tongue to hold the ducts in communicating relation.

2. In a branch take off connection, the combination with a duct having an inlet end, and having a wall formed with an opening receding from said end, such opening having an edge formed, remotely from said end, by said wall, two other edges of said opening being formed by walls substantially transverse to said wall, of a take off duct seating on the two last mentioned edges and exteriorly lapping portions of the walls forming such edges, and having a tongue interiorly lapping a portion of the wall forming said remote edge, and having an inlet end substantially flush with the inlet end of the first mentioned duct, and means securing the take off duct to each of said seat-forming walls at points adjacent said flush inlet ends.

3. In a branch take off connection, the combination with a substantially rectangular sheet metal duct having an inlet end and a take off opening receding from such end, such opening having an edge remote from said end and substantially transverse to the duct, of a take off duct communicating with the take off opening and having an end substantially flush with the inlet end of the first mentioned duct, such flush ends forming a substantially rectangular inlet of greater capacity than either duct, the take off duct having a tongue inserted within the first mentioned duct at said edge of the take off opening to hold the ducts in their communicating relation, and means further interconnecting the ducts to maintain said relation.

EDWARD WASMUND.